(12) United States Patent
Sharma

(10) Patent No.: US 10,735,540 B1
(45) Date of Patent: Aug. 4, 2020

(54) AUTOMATED PROXY SELECTION AND SWITCHOVER

(71) Applicant: EMC IP Holding Company LLC, Hopkinton, MA (US)

(72) Inventor: Anupam Sharma, Bangalore (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 111 days.

(21) Appl. No.: 15/494,455

(22) Filed: Apr. 22, 2017

(51) Int. Cl.
*G06F 3/06* (2006.01)
*G06F 11/14* (2006.01)
*G06F 12/00* (2006.01)
*G06F 12/02* (2006.01)
*G06F 12/16* (2006.01)
*G06F 15/16* (2006.01)
*H04L 29/08* (2006.01)
*G06F 11/20* (2006.01)

(52) U.S. Cl.
CPC .......... *H04L 67/28* (2013.01); *H04L 67/1097* (2013.01); *H04L 67/146* (2013.01); *H04L 67/148* (2013.01); *G06F 3/067* (2013.01); *G06F 11/1448* (2013.01); *G06F 11/1451* (2013.01); *G06F 11/1461* (2013.01); *G06F 11/1469* (2013.01); *G06F 11/1484* (2013.01); *G06F 11/202* (2013.01)

(58) Field of Classification Search
None
See application file for complete search history.

(56) References Cited

U.S. PATENT DOCUMENTS

| | | | | |
|---|---|---|---|---|
| 8,751,515 B1* | 6/2014 | Xing | ................. | G06F 17/30073 707/755 |
| 8,782,008 B1* | 7/2014 | Xing | ................. | G06F 17/30575 707/660 |
| 9,471,360 B2* | 10/2016 | Ashok | ................. | G06F 9/45558 |
| 9,665,445 B1* | 5/2017 | Acharya | ............. | G06F 11/1464 |
| 2003/0031127 A1* | 2/2003 | Saleh | ................. | H04J 14/0227 370/228 |
| 2004/0006615 A1* | 1/2004 | Jackson | ................. | H04L 29/06 709/223 |
| 2011/0246735 A1* | 10/2011 | Bryant | ................. | G06F 11/1448 711/162 |
| 2017/0123975 A1* | 5/2017 | Tseng | ................... | G06F 3/0608 |

FOREIGN PATENT DOCUMENTS

WO WO-2008020644 A1 * 2/2008 ........... H04L 65/105

* cited by examiner

*Primary Examiner* — Nicholas R Taylor
*Assistant Examiner* — Ho T Shiu
(74) *Attorney, Agent, or Firm* — Staniford Tomita LLP

(57) ABSTRACT

Embodiments are directed to a method of automatically assigning proxy nodes to proxy servers in a backup system by allocating the proxy nodes to a common proxy node pool, defining rules for assignment of the proxy nodes to the proxy servers, receiving backup sessions from the proxy servers, assigning proxy nodes to the proxy servers in accordance with at least one of an order of received backup sessions and the defined rules, and returning assigned proxy nodes back to the common proxy node pool upon completion of respective backup sessions.

18 Claims, 8 Drawing Sheets

AUTOMATED PROXY SELECTION AND SWITCHOVER

TECHNICAL FIELD

Embodiments are generally directed to network-based data backup methods, and more specifically to automated selection and switchover of proxy nodes.

COPYRIGHT NOTICE

A portion of the disclosure of this patent document contains material that is subject to copyright protection. The copyright owner has no objection to the facsimile reproduction by anyone of the patent disclosure, as it appears in the Patent and Trademark Office patent files or records, but otherwise reserves all copyright rights whatsoever.

BACKGROUND

Backup and recovery software products are crucial for enterprise level network clients. Customers rely on backup systems to efficiently back up and recover data in the event of user error, data loss, system outages, hardware failure, or other catastrophic events to allow business applications to remain in service or quickly come back up to service after a failure condition or an outage. The advent of virtualization technology has led to the increased use of virtual machines as data storage targets. Virtual machine (VM) disaster recovery systems using hypervisor platforms, such as a vSphere or ESXi platform from VMware or Hyper-V from Microsoft, among others, have been developed to provide recovery from multiple disaster scenarios including total site loss. The immense amount of data involved in large-scale (e.g., municipal, enterprise, etc.) level backup applications and the number of different potential problems that exist means that backup performance and reliable operation is a critical concern for system administrators.

In a backup system, a backup proxy is a component responsible retrieving and transferring VM data. During backup or replication activities, the backup proxy retrieves VM data from the source datastore, processes it and transfers to the destination storage. The backup proxy is also used to write data back to the source datastore during full VM restore and VM disk restore. In general, the backup proxy must provide an optimal route for VM data traffic and configuring a backup proxy requires analysis of the connection between the source datastore and the backup proxy.

In present backup systems, proxy nodes are typically associated with the backup application proxy server and are therefore tightly coupled together. Each backup application can have many proxy servers associated with it, which themselves might be associated with same hypervisor or a different hypervisor. The association of proxy nodes to the proxy server is mainly due to the fact that during the backup operation, the system needs more parallel sessions and since a proxy server has a certain limitation, it needs associated proxy nodes to help and offload its work.

The tight coupling or association of proxy nodes to specific proxy servers often results in non-optimal use of system resources since some proxy nodes may go unused. Thus, certain tightly coupled proxy servers may sit idle even during periods when those resources may be better used for other purposes. Also, if the backup environment has more than one proxy server then each proxy server needs to have the same number (x) of proxy nodes in order to achieve desired concurrency. Furthermore, proxy node assignment is often a manual user-specified process that adds overhead and imposes a tedious task for users.

What is needed is a backup system that that provides greater use of available resources and provides automated proxy selection, thus requiring no manual association of proxy node simplify user involvement and enhance the total customer experience.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions. EMC, Networker, Data Domain, Data Domain Restorer, and Data Domain Boost are trademarks of Dell EMC Corporation.

BRIEF DESCRIPTION OF THE DRAWINGS

In the following drawings like reference numerals designate like structural elements. Although the figures depict various examples, the one or more embodiments and implementations described herein are not limited to the examples depicted in the figures.

DETAILED DESCRIPTION

Figure 1:
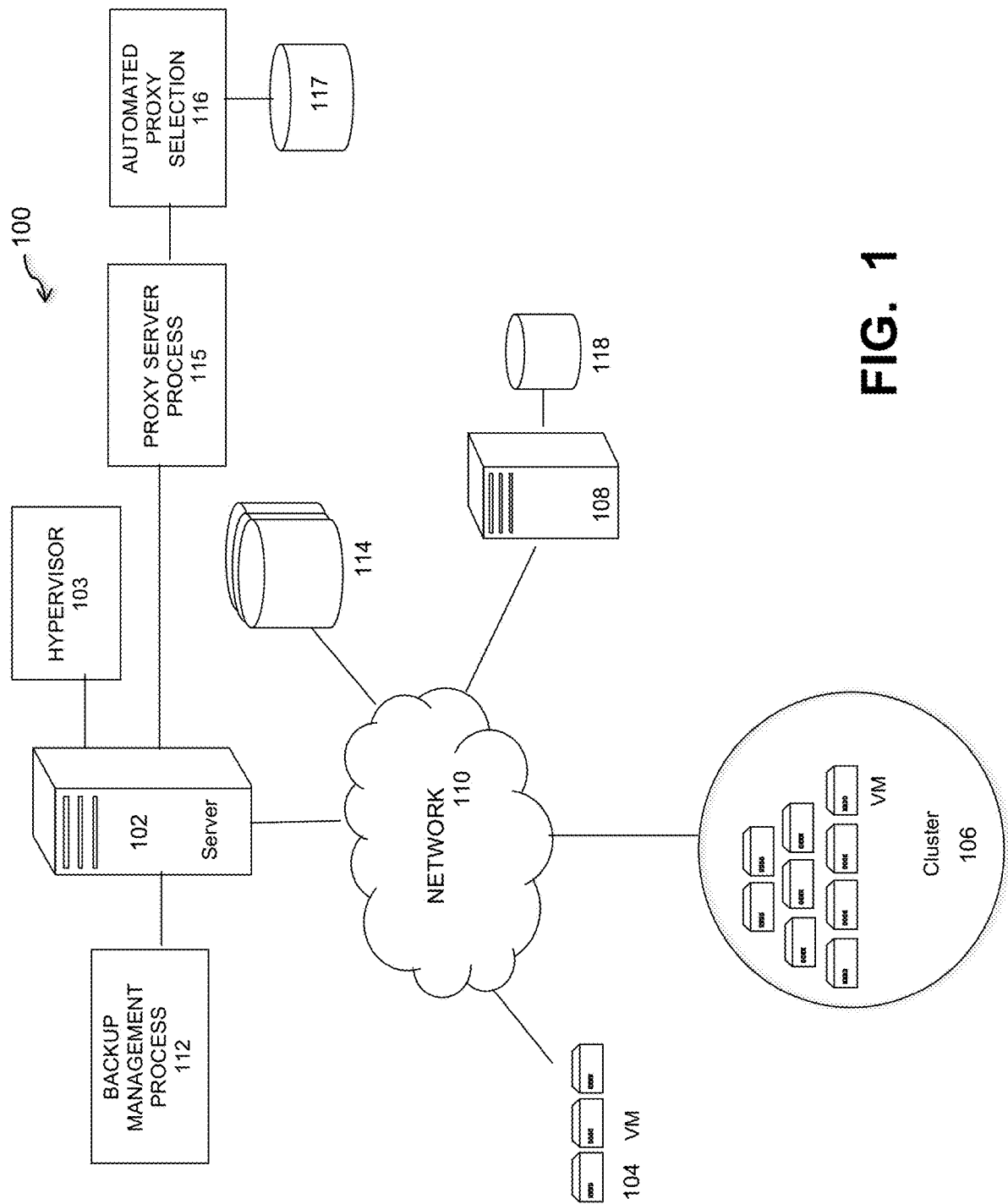
FIG. 1 is a diagram of a large-scale network implementing an automated proxy selection and switchover manager under some embodiments.

A detailed description of one or more embodiments is provided below along with accompanying figures that illustrate the principles of the described embodiments. While aspects of the invention are described in conjunction with such embodiment(s), it should be understood that it is not limited to any one embodiment. On the contrary, the scope is limited only by the claims and the invention encompasses numerous alternatives, modifications, and equivalents. For the purpose of example, numerous specific details are set forth in the following description in order to provide a thorough understanding of the described embodiments, which may be practiced according to the claims without some or all of these specific details. For the purpose of clarity, technical material that is known in the technical fields related to the embodiments has not been described in detail so that the described embodiments are not unnecessarily obscured.

It should be appreciated that the described embodiments can be implemented in numerous ways, including as a process, an apparatus, a system, a device, a method, or a computer-readable medium such as a computer-readable storage medium containing computer-readable instructions or computer program code, or as a computer program product, comprising a computer-usable medium having a computer-readable program code embodied therein. In the context of this disclosure, a computer-usable medium or computer-readable medium may be any physical medium that can contain or store the program for use by or in connection with the instruction execution system, apparatus or device. For example, the computer-readable storage medium or computer-usable medium may be, but is not limited to, a random access memory (RAM), read-only memory (ROM), or a persistent store, such as a mass storage device, hard drives, CDROM, DVDROM, tape, erasable programmable read-only memory (EPROM or flash memory), or any magnetic, electromagnetic, optical, or electrical means or system, apparatus or device for storing information. Alternatively, or additionally, the computer-readable storage medium or computer-usable medium may be any combination of these devices or even paper or another suitable medium upon which the program code is printed, as the program code can be electronically captured, via, for instance, optical scanning of the paper or other medium, then compiled, interpreted, or otherwise processed in a suitable manner, if necessary, and then stored in a computer memory. Applications, software programs or computer-readable instructions may be referred to as components or modules. Applications may be hardwired or hard coded in hardware or take the form of software executing on a general-purpose computer or be hardwired or hard coded in hardware such that when the software is loaded into and/or executed by the computer, the computer becomes an apparatus for practicing the invention. Applications may also be downloaded, in whole or in part, through the use of a software development kit or toolkit that enables the creation and implementation of the described embodiments. In this specification, these implementations, or any other form that the invention may take, may be referred to as techniques. In general, the order of the steps of disclosed processes may be altered within the scope of the invention.

Some embodiments of the invention involve automated backup techniques in a distributed system, such as a very large-scale wide area network (WAN), metropolitan area network (MAN), or cloud based network system, however, those skilled in the art will appreciate that embodiments are not limited thereto, and may include smaller-scale networks, such as LANs (local area networks). Thus, aspects of the one or more embodiments described herein may be implemented on one or more computers executing software instructions, and the computers may be networked in a client-server arrangement or similar distributed computer network.

FIG. 1 illustrates a computer network system 100 that implements one or more embodiments of an automated proxy selection and switchover process for backing up virtual machines and VM clusters in a large-scale computer network. In system 100, a number of VMs or groups of VMs 104 are provided to serve as backup targets. Target VMs may also be organized into one or more clusters or virtual centers 106 representing a physical or virtual network of many virtual machines (VMs), such as on the order of hundreds to thousands of VMs each. The VMs serve as target storage devices for data backed up from one or more data sources, such as computer 108, which may have attached local storage 118 or utilize networked accessed storage devices 114. The data sourced by the data source may be any appropriate data, such as database data that is part of a database management system. In this case, the data may reside on one or more hard drives (118 and/or 114) and may be stored in the database in a variety of formats. One example is an Extensible Markup Language (XML) database, which is a data persistence software system that allows data to be stored in XML format. Another example is a relational database management system (RDMS) that uses tables to store the information. Computer 108 may represent a database server that instantiates a program that interacts with the database. Each instance of a database server may, among other features, independently query the database and store information in the database, or it may be an application server that provides user interfaces to database servers, such as through web-based interface applications or through virtual database server or a virtual directory server applications.

A network server computer 102 is coupled directly or indirectly to the target VMs 104 and 106, and to the data source 108 through network 110, which may be a cloud network, LAN, WAN or other appropriate network. Network 110 provides connectivity to the various systems, components, and resources of system 100, and may be implemented using protocols such as Transmission Control Protocol (TCP) and/or Internet Protocol (IP), well known in the relevant arts. In a distributed network environment, network 110 may represent a cloud-based network environment in which applications, servers and data are maintained and provided through a centralized cloud-computing platform. In an embodiment, system 100 may represent a multi-tenant network in which a server computer runs a single instance of a program serving multiple clients (tenants) in which the program is designed to virtually partition its data so that each client works with its own customized virtual application, with each VM representing virtual clients that may be supported by one or more servers within each VM, or other type of centralized network server.

The data generated or sourced by system 100 may be stored in any number of persistent storage locations and devices, such as local client storage, server storage (e.g., 118), or network storage (e.g., 114), which may at least be partially implemented through storage device arrays, such as RAID components. In an embodiment network 100 may be implemented to provide support for various storage architectures such as storage area network (SAN), Network-attached Storage (NAS), or Direct-attached Storage (DAS) that make use of large-scale network accessible storage devices 114, such as large capacity disk (optical or magnetic) arrays. In an embodiment, the target storage devices, such as disk array 114 may represent any practical storage device or set of devices, such as fiber-channel (FC) storage area network devices, and OST (OpenStorage) devices. In a preferred embodiment, the data source storage is provided through VM or physical storage devices, and the target storage devices represent disk-based targets implemented through virtual machine technology.

For the embodiment of FIG. 1, network system 100 includes a VM server 102 that executes hypervisor or virtual machine monitor (VMM) 103 that creates and runs virtual machines, such as VMs 104 or clustered VMs 106. In this embodiment, server 102 is a host machines and each VM is a guest machine. In an embodiment, hypervisor 103, which may be implemented as a Hyper-V hypervisor, provides the guest operating systems of the VMs with a virtual operating platform and manages the execution of the VMs. In an embodiment, the backup management process 112 is configured to operate with the Hyper-V hypervisor, which is a native hypervisor that creates VMs on Intel x86-64 based systems and is an integral part of the Microsoft Windows server products.

Server 102 may also serve as a backup server that executes a backup management process 112, which automates the backup of data using the target VM devices. In an embodiment, the process 112 uses certain known full and incremental (or differencing) backup techniques along with a snapshot backup process that is used to store an image or images of the system(s) to be backed up prior to the full or incremental backup operations. The backup management 112 and hypervisor 103 functions of system 100 may be implemented on a single server, such as server 102, or they may be distributed among two or more servers, such as in a system with a dedicated backup server and a separate dedicated VM monitor server. Embodiments of the single agent sharing system and method described herein apply equally to both network configurations, and other distributed server systems.

In an embodiment, system 100 may represent a Data Domain Restorer (DDR)-based deduplication storage system, and storage server 128 may be implemented as a DDR Deduplication Storage server provided by EMC Corporation. However, other similar backup and storage systems are also possible. System 100 may utilize certain protocol-specific namespaces that are the external interface to applications and include NTS (network file system) and CIFS (common internet file system) namespaces, as well as DD Boost provided by EMC Corporation. In general, DD Boost (Data Domain Boost) is a system that distributes parts of the deduplication process to the backup server or application clients, enabling client-side deduplication for faster, more efficient backup and recovery.

In an embodiment, the backup server 102 of FIG. 1 executes a proxy server process 115 that acts as a data mover to retrieve and transfer VM data. During backup or replication activities, this process retrieves VM data from the source datastore, such as server 108, and transfers it to the destination storage, such as VMs 104 or 106. In this configuration, server 102 is configured to be a proxy server, though this function can also be assigned to a different server from the backup server in the system. A number of proxy nodes are assigned to or associated with the proxy server 102 through a proxy node selection process 116. These proxy nodes help perform backup functions through parallel sessions. The number of proxy nodes is generally selected to overcome any limits of the proxy server and offload the backup tasks to the associated proxy nodes.

Figure 2:
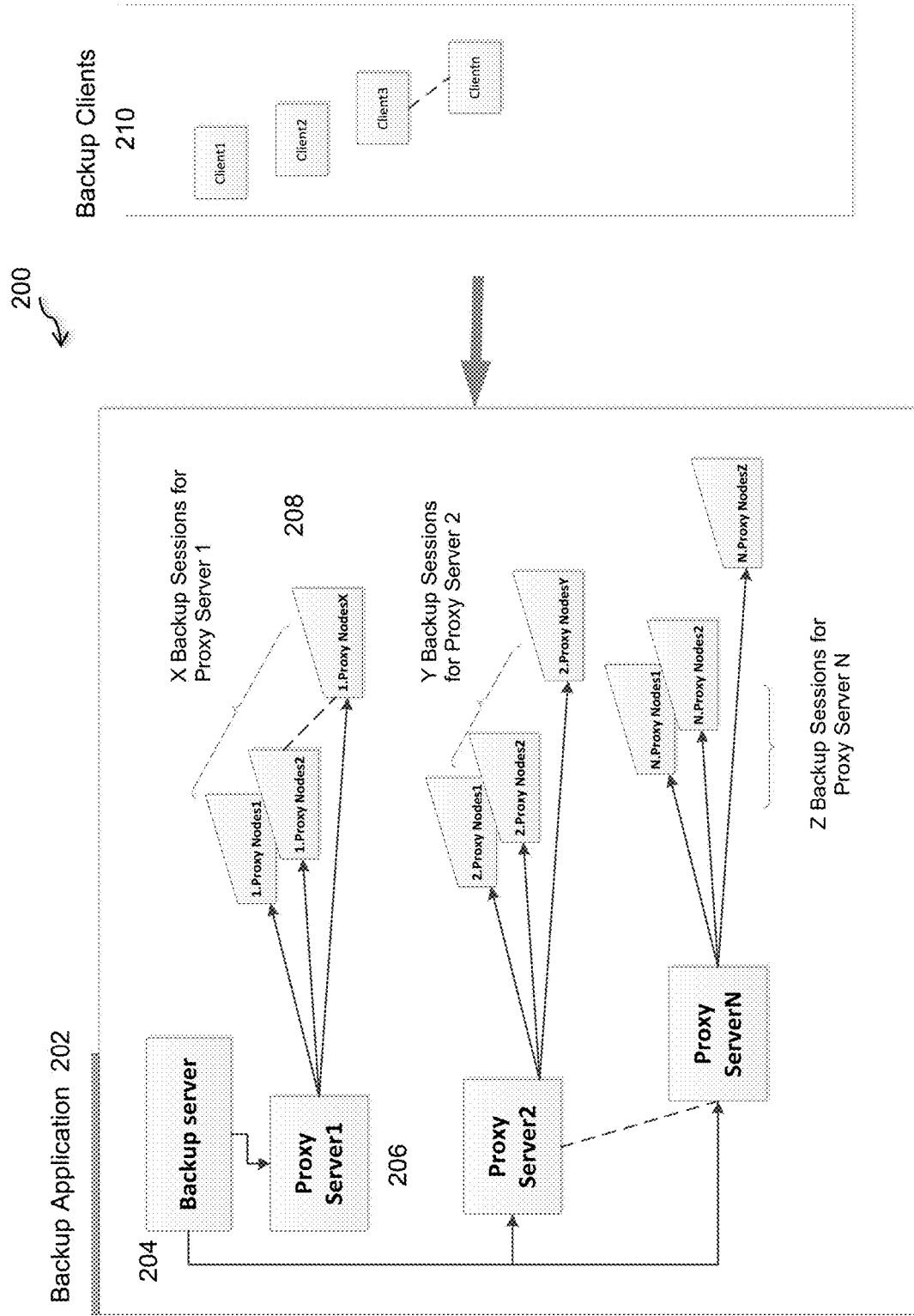
FIG. 2 illustrates a system in which a backup application may have multiple proxy servers to perform a backup process under some embodiments.

FIG. 2 illustrates a system in which a backup application may have multiple proxy servers to perform a backup process under some embodiments. As shown for system 200 of FIG. 2, a backup application 202 executed on backup server 204 serves backup clients 210, which may comprise any number (n) of VM or physical nodes. The backup server 204 has a number N of proxy servers 206, denoted Proxy Server 1 to Proxy Server N. Each proxy server, e.g., server 206 has a tightly coupled set of proxy nodes, e.g., set 208 that are associated with that particular proxy server. Thus, as shown in the example system 200, Proxy Server 1 has a number X of proxy nodes denoted 1.Proxy Node 1 to 1.Proxy Node X. Similarly, Proxy Server 2 has a number Y of proxy nodes denoted 2.Proxy Node 1 to 2.Proxy Node Y, and Proxy Server N has a number Z of proxy nodes denoted N.Proxy Node 1 to N.Proxy Node Z. The numbers of proxy nodes for each proxy server (X, Y, Z) may be the same as each other or different for each server. In general, the backup sessions that are performed by a particular proxy server may or may not be utilize all the associated proxy nodes at all times, and so some might sit idle for some time. For example, for Proxy Server 1, only nodes 1.Proxy Node 1 to 1.Proxy Node 3 may be used, leaving 1.Proxy Node 4 to 1.Proxy Node X idle. This may create a disadvantageous overhead situation as all proxy servers will have their own proxy nodes, but any particular time they might not be fully utilized. There may also be a concurrency problem in the system of FIG. 2. For example, assume that each proxy server has 10 sessions that are provided by the proxy nodes so that a maximum 10 backups can go on each proxy server at any point in time. Although there are N*10 sessions available, every 10 of them are exclusively coupled with a particular proxy server.

In an embodiment, the proxy nodes of system 200 are rearranged to form a proxy node pool that is formed and processed by the proxy server process 115 of FIG. 1 using the automated proxy selection process 116. The automatic proxy node selection process identifies all of the proxy nodes and forms them into a common pool for all of the proxy servers, e.g., server 206. The pooled proxy nodes are assigned to specific proxy servers at the e of a particular backup operation and once the backup operation is complete, the proxy nodes are allocated back to common pool. This provides better resource utilizadon of proxy node resources by assigning proxy nodes to proxy servers on 'on-demand' basis.

Figure 3:
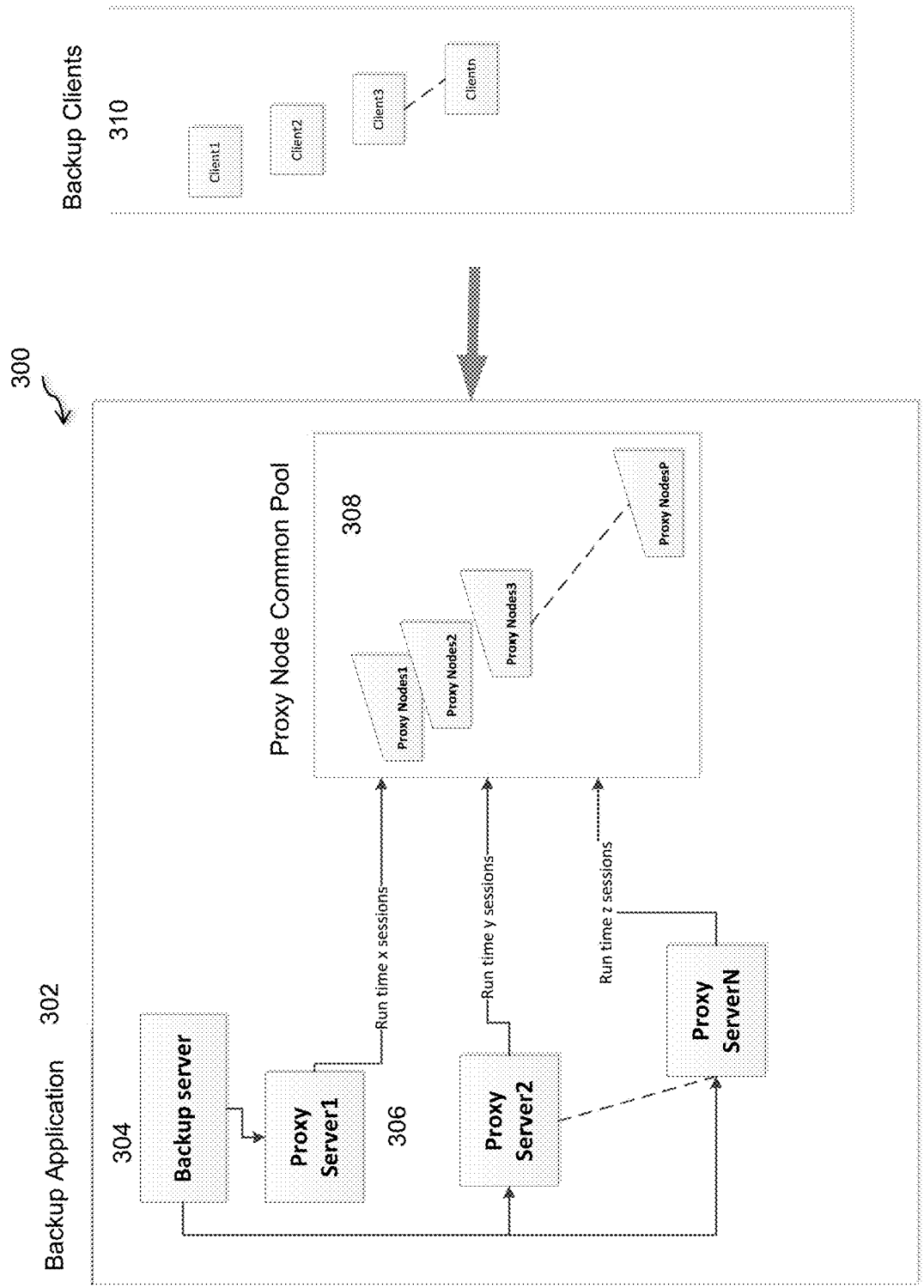
FIG. 3 illustrates a backup system having a proxy node common pool under some embodiments.

FIG. 3 illustrates a backup system having a proxy node common pool under some embodiments. As shown for system 300 of FIG. 3, backup application 302 running on backup server 304 serves backup clients 310. The backup server 304 supports a number N proxy servers, e.g., server 306. The proxy servers are denoted Proxy Server 1 to Proxy Server N. Each proxy server runs a number of backup sessions. For the example shown Proxy Server 1 runs x sessions, Proxy Server 2 runs y session, and Proxy Server N runs z sessions. Instead of being tightly coupled to their own set of proxy nodes, a number P of proxy nodes denoted Proxy Node 1 to Proxy Node P are organized into a common pool 308 of proxy nodes. The proxy node selection process 116 allocates the proxy nodes to particular proxy servers upon the execution of the run time backup sessions. Thus, once a proxy server initiates backup, the process 116 attaches an appropriate number of proxy nodes to it. Once the backup session is over these nodes are then returned to the common pool 308 and made available for other the proxy server to take. The number of attached proxy nodes at runtime may be determined based on current need and any concurrency requirements.

The proxy node common pool 308 provides an organization structure and resource that allows for dynamic and automated allocation of an appropriate number of proxy nodes among a number of proxy servers. For the example system 300 of FIG. 3, there are P total number of proxy nodes available, where P proxy nodes can provide x+y+z number of sessions all together, or more or less at any one time. For example, at any point in time when Proxy Server 1 needs to run backup for x number of sessions, this node will take number of proxy nodes from the pool which can provide him x number of sessions.

With regard to proxy node selection and allocation, the proxy server process may implement certain operational rules and parameters. For example, every proxy server may have a default number internal nodes available to it so it will always have some proxy nodes to begin a backup. If any particular proxy server is critical and needs to always have backup sessions available with it then the process 115 can provide a strict coupling with selected proxy nodes and those nodes will be then permanently added to this proxy server unless they are removed manually. Also in a large backup environment, the system can switch proxy nodes between different hypervisors 103 automatically. The backup application itself can perform such a node selection, or the automated proxy selection process 116 of the backup server 102 can perform this allocation among hypervisors.

In another example, the backup server can set a cap value for the sessions to limit the sessions to a maximum number. In this case, the proxy server cannot request proxy nodes above certain number of sessions. This cap value is required in scenarios where the system is configured to set priority for the backups that may be more important. So, for example, when Proxy Server 1 makes an allocation request for x sessions, it will be allowed to do so, the selection process will then see if the common pool 308 has enough proxy nodes available to be allocated for fulfilling the x sessions. If they are available, they will be allocated, otherwise whatever nodes are available will be provided to Proxy Server 1.

In another example scenario, there may be proxy nodes present but they may not be allocated to Proxy Server 1 at all. The reason can be that a higher priority server is preempting this allocation request. For example, Proxy Server N has made a request for z number of sessions and since it has higher priority than Proxy Server 1, it will be given preference in being assigned its proxy nodes. The backup administrator is also allowed to a block set of proxy nodes for a high priority or very important proxy server, so that it always gets the required numbers of proxy nodes. However, this may again create wastage of resource therefore assignment of priority of servers is done only when absolutely needed. If all the proxy servers have same the priority, and a proxy server does not get any allocated proxy nodes, it will still have its own internal proxy sessions which it can always use. In this manner, there will not be a situation where a proxy server cannot run backups.

In an environment where there is more than one hypervisor, a mechanism may be implemented to associate proxy nodes from a server in hypervisor 1 and another server in hypervisor 2. This solution allows switching between hypervisors as a proxy node will not have any coupling with any proxy server.

The numbers of proxy servers (N), run time sessions (x, y, z) and proxy nodes (P) may vary depending on the system size, resource availability, backup requirements, and other characteristics. A typical number of proxy servers may be on the order of 100, while the number of proxy nodes (P) may be on the order of 25 or more. Embodiments are not so limited, however, and any practical number may be used.

Figure 4:
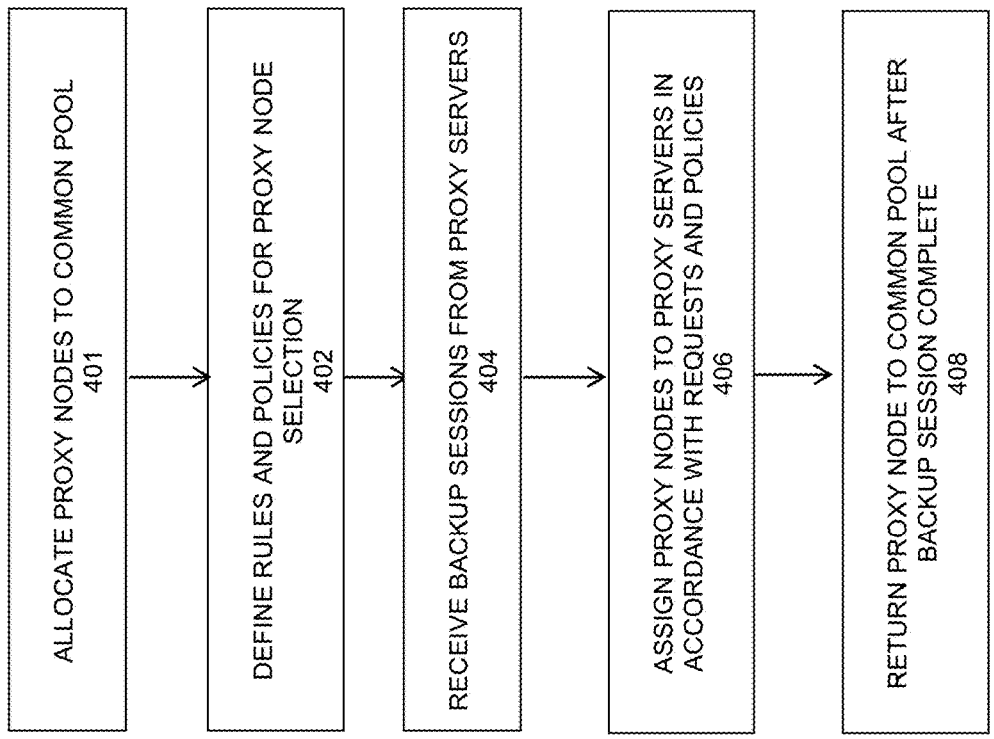
FIG. 4 is a flowchart that illustrates a method of automatically selecting proxy nodes in a backup system under some embodiments.
Figure 5:
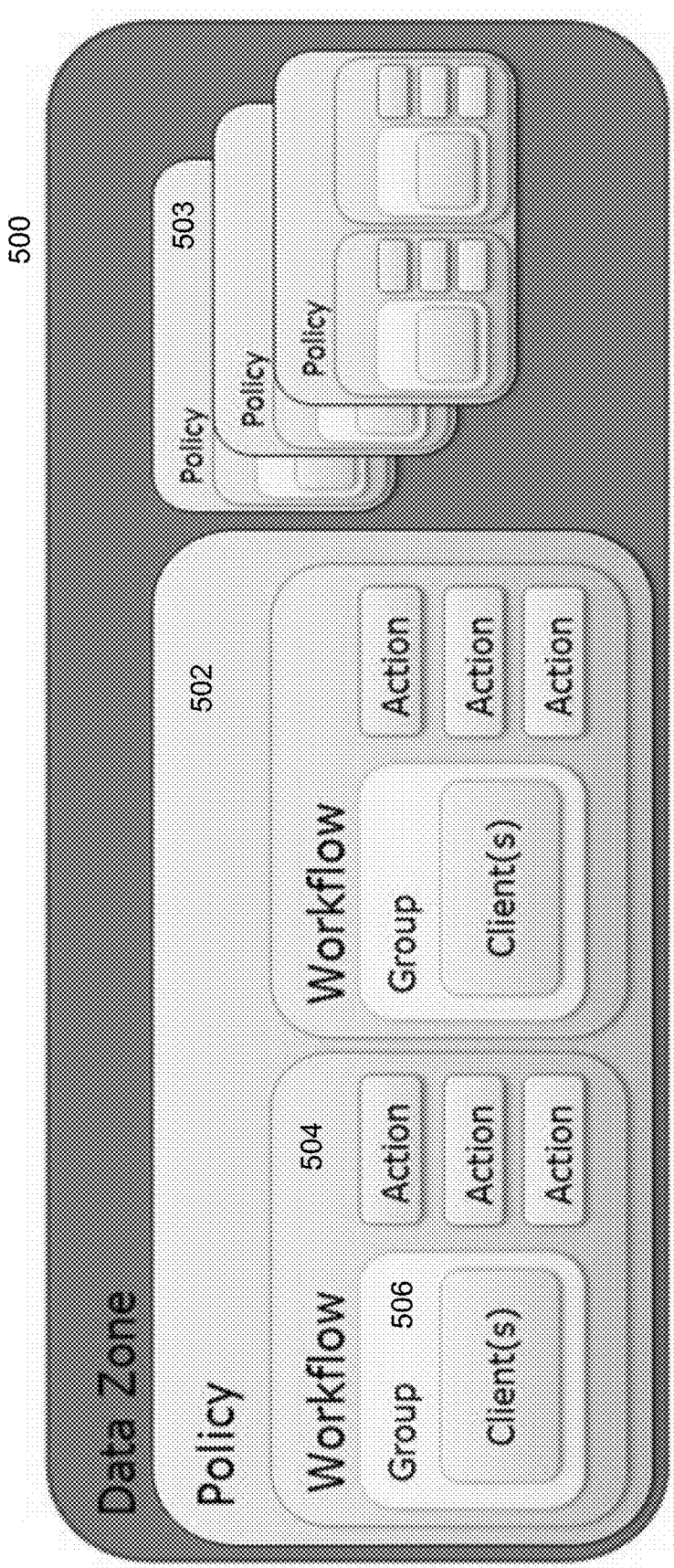
FIG. 5 illustrates the structure of a policy used by the proxy node selection process under an embodiment.

In an embodiment, the proxy nodes are specified by a defined data string and maintained in a database that is utilized by the proxy server process 115 that is maintained in a proxy node database 117. The process of proxy node allocation and de-allocation once the backup process is complete can be performed by the backup server or any additional service can be created which will allocate and reallocate sessions and keep the relevant resource information in a database. FIG. 4 is a flowchart that illustrates a method of automatically selecting proxy nodes in a backup system under some embodiments. The method of FIG. 4 begins with the allocation of a number P of proxy nodes to a common proxy node pool, step 401. Rules and policies are defined for proxy node selection, step 402. Such rules may include various operational and configuration parameters such as cap value for sessions, proxy server priorities, proxy node bindings, timeouts, and so on. The policies defined within the system comprise definitions of VM groups, actions, and the identity of the node/device where the action is performed. FIG. 5 illustrates the structure of a policy used by the proxy node selection process under an embodiment. As shown in FIG. 5, a policy 502 is defined within a data zone 500, which may include a number of different policies, e.g., 503. A policy 502 may comprise one or more workflow definitions 504. The workflow 504 specifies the group 506 of client(s), which are the VMs that perform certain specified actions. The actions may be standard backup functions, such as backup, clone, restore, recover, and so on. The clients within the group thus define where to perform the specified actions and the workflow 504 defines a set of actions performed by the client or clients in the group 506.

With reference back to FIG. 4, the proxy server process 115 receives requested backup sessions from the proxy servers, step 404. As shown in FIG. 3, a number of different sessions can be requested from the N different proxy servers. The proxy selection process 116 then assigns or allocates proxy nodes from among the total number P of proxy nodes to the x+y+z sessions in accordance with the policies and rules, step 406. These backup sessions are then performed against the policies so that the specified actions (e.g., backup, recover, clone, etc.) are performed by the appropriate client in the group. Once each backup session is complete, the respective proxy node is returned to the common pool, step 408.

Figure 6:
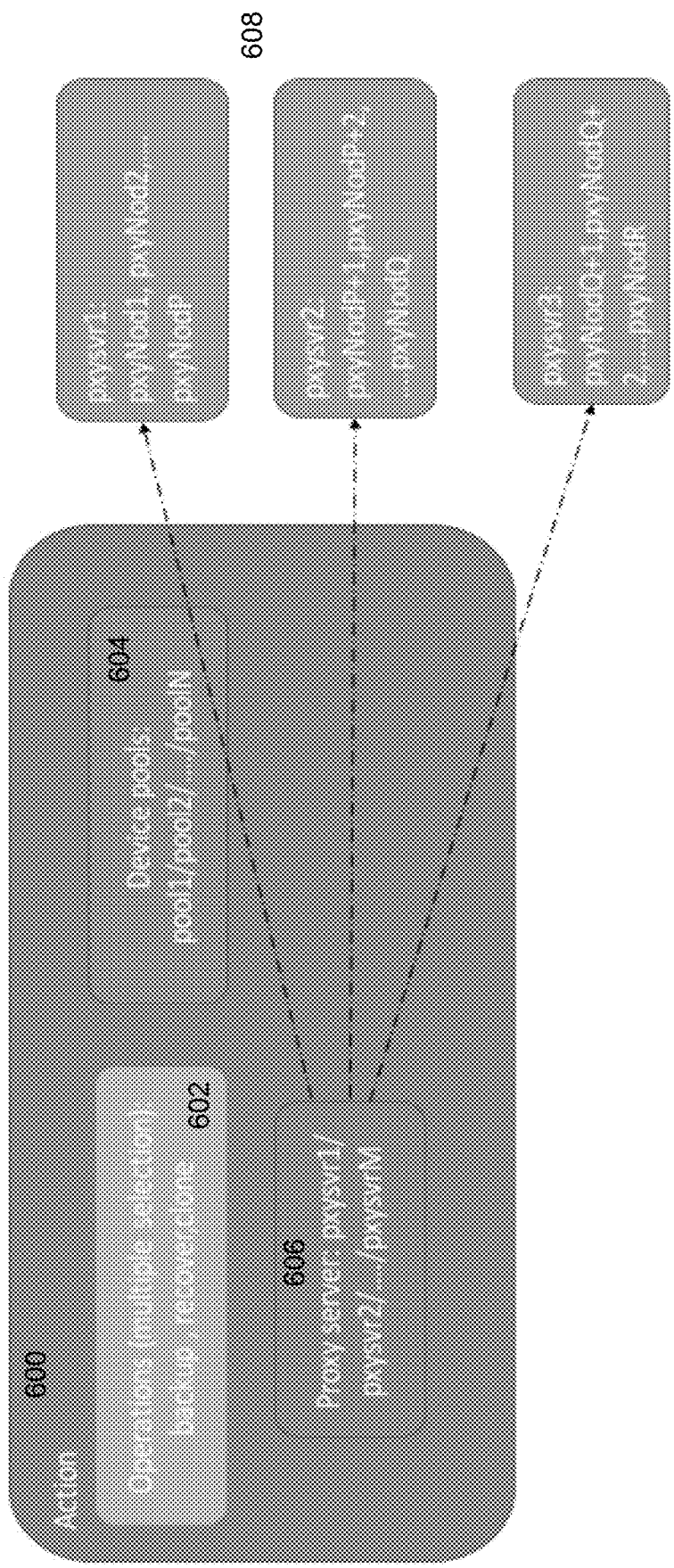
FIG. 6 is n illustrates an action for a proxy nodes assigned to proxy servers under a first example embodiment.

FIG. 6 is an illustrates an action for a proxy nodes assigned to proxy servers under a first example embodiment. FIG. 6 illustrates the operation of an action in the case of tightly coupled proxy nodes that are strictly assigned to particular proxy servers, as shown in FIG. 2. In this case, the action 600 includes operations 602 that specify certain backup operations (e.g., backup, recover, clone) operating on devices organized into device pools 604 and that use one or more proxy servers 606. The proxy nodes are strictly assigned to specific servers, thus as shown in FIG. 6, Proxy Server 1 (pxysvr1) has proxy nodes (pxyNod) 1 to P, Proxy Server 2 (pxysvr2 has proxy nodes P+1 to Q, and Proxy Server 3 has nodes Q+1 to R, and so on up to Proxy Server M.

Figure 7:
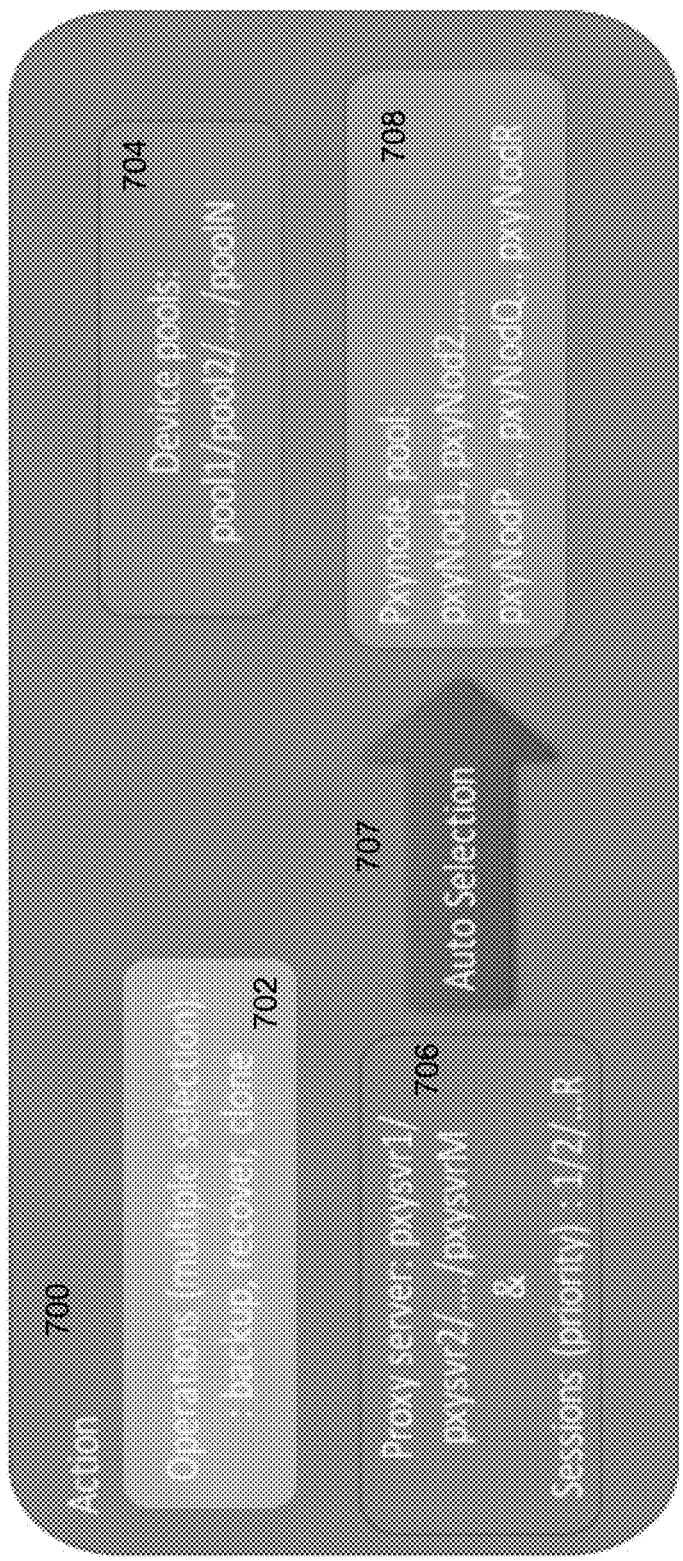
FIG. 7 is an illustrates an action for a proxy nodes assigned to proxy servers under a second example embodiment.

Using the proxy node common pool 308 of FIG. 3 allows the assignment of proxy nodes to be allocated and assigned in a dynamic and automated manner. FIG. 7 is an illustrates an action for a proxy nodes assigned to proxy servers under a second example embodiment that corresponds to the common pool scheme of FIG. 3. As shown in FIG. 7, action 700 comprises operations 702 and device pools 704, as above for FIG. 6. The assignment of proxy nodes to proxy servers, however, is performed dynamically through auto selection process 707. In this embodiment, the proxy node common pool (Pxynode pool) 708 is populated with a number of proxy nodes. The proxy servers through their requested backup sessions 706 are allocated the proxy nodes from the proxy node pool 708 in accordance with the order of the request and relevant rules (priority, binding, etc.).

In the manner thus described with respect to certain computer-implemented processes and computer hardware components, the issue of selecting and assigning proxy nodes to proxy servers overcomes the issues of tightly coupled proxy nodes, namely resource under-utilization, and lack of concurrency. The proxy node common pool mechanism and automatic selection process provides greater and optimal use of available VM backup resources and avoids overhead and user input. The automated proxy selectin process eliminates the manual and persistent association of proxy nodes and proxy servers, and generally enhances the total customer experience.

Certain above code segments and naming conventions, and any others shown herein are provided for the sake of illustration only, and do not limit any embodiments or implementations. Many alternative languages, data elements, and code structures as known to those of skill in the art may be used to achieve the same functionality.

Although embodiments have been described with respect to backup comprising certain specific technologies, such as Hyper-V servers, backup agents, and VM clusters, it should be noted that embodiments are not so limited, and that other backup systems and methods may also utilize the proxy node common pool and auto selection process.

Figure 8:
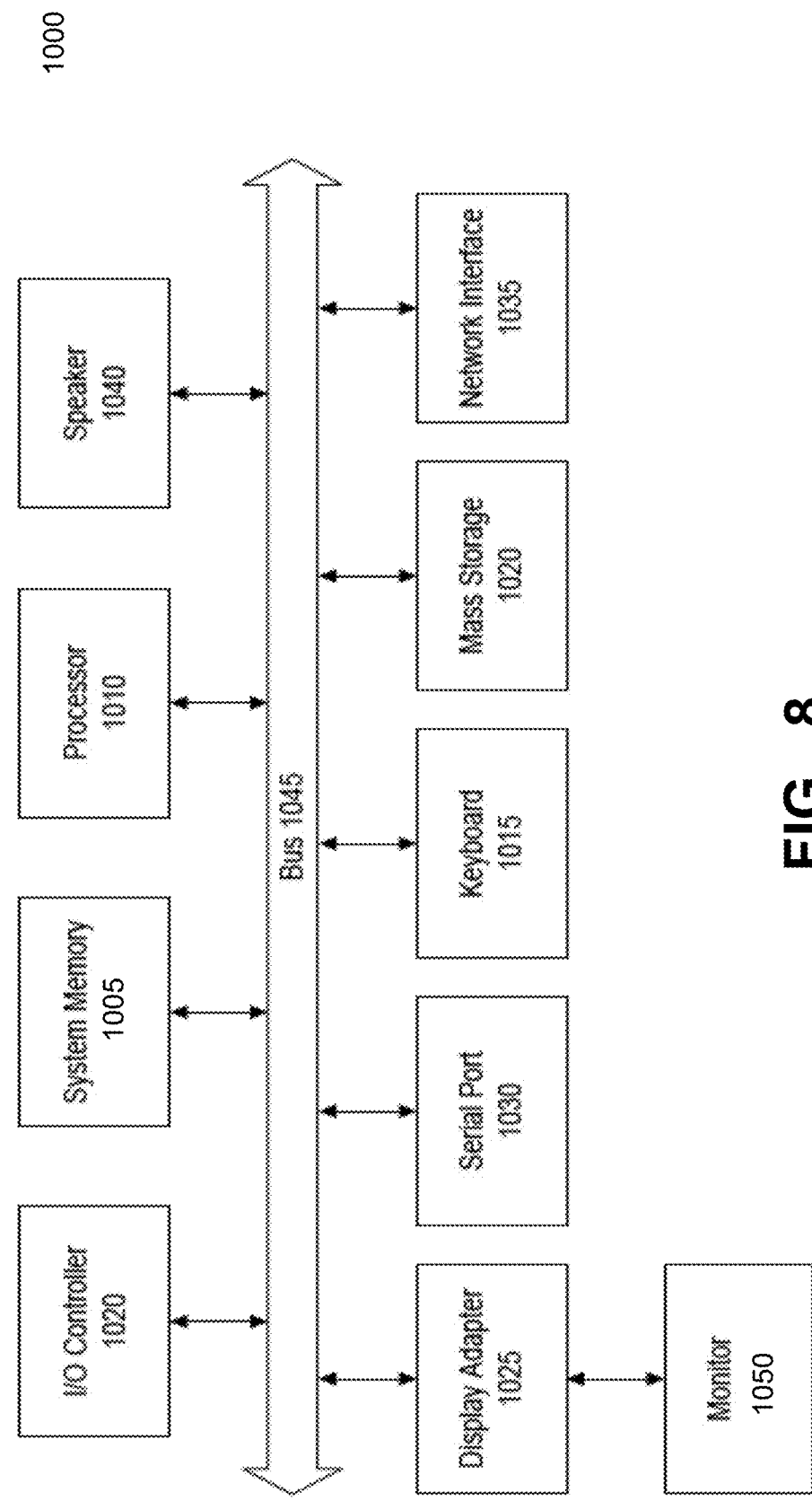
FIG. 8 shows a system block diagram of a computer system used to execute the software of the present system described herein.

The cloud computing environment of FIG. 1 may comprise any number of individual client-server networks coupled over the Internet or similar large-scale network or portion thereof. Each node in the network(s) comprises a computing device capable of executing software code to perform the processing steps described herein. FIG. 8 shows a system block diagram of a computer system used to execute one or more software components of the present system described herein. The computer system 1005 includes a monitor 1050, keyboard 1015, and mass storage devices 1020. Computer system 1000 further includes subsystems such as central processor 1010, system memory 1005, input/output (I/O) controller 1020, display adapter 1025, serial or universal serial bus (USB) port 1030, network interface 1035, and speaker 1040. The system may also be used with computer systems with additional or fewer subsystems. For example, a computer system could include more than one processor 1010 (i.e., a multiprocessor system) or a system may include a cache memory.

Arrows such as 1045 represent the system bus architecture of computer system 1005. However, these arrows are illustrative of any interconnection scheme serving to link the subsystems. For example, speaker 1040 could be connected to the other subsystems through a port or have an internal direct connection to central processor 1010. The processor may include multiple processors or a multicore processor, which may permit parallel processing of information. Computer system 1000 shown in FIG. 8 is but an example of a computer system suitable for use with the present system. Other configurations of subsystems suitable for use with the present invention will be readily apparent to one of ordinary skill in the art.

Computer software products may be written in any of various suitable programming languages. The computer software product may be an independent application with data input and data display modules. Alternatively, the computer software products may be classes that may be instantiated as distributed objects. The computer software products may also be component software. An operating system for the system may be one of the Microsoft Windows®. family of systems (e.g., Windows Server), Linux, Mac OS X, IRIX32, or IRIX64. Other operating systems may be used. Microsoft Windows is a trademark of Microsoft Corporation.

Furthermore, the computer may be connected to a network and may interface to other computers using this network. The network may be an intranet, internet, or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11, 802.11a, 802.11b, 802.11e, 802.11g, 802.11i, 802.11n, 802.11ac, and 802.11ad, just to name a few examples), near field communication (NFC), radio-frequency identification (RFID), mobile or cellular wireless. For example, signals from a computer may be transferred, at least in part, wirelessly to components or other computers.

In an embodiment, with a web browser executing on a computer workstation system, a user accesses a system on the World Wide Web (WWW) through a network such as the Internet. The web browser is used to download web pages or other content in various formats including HTML, XML, text, PDF, and postscript, and may be used to upload information to other parts of the system. The web browser may use uniform resource identifiers (URLs) to identify resources on the web and hypertext transfer protocol (HTTP) in transferring files on the web.

In other implementations, the user accesses the system through either or both of native and nonnative applications. Native applications are locally installed on the particular computing system and are specific to the operating system or one or more hardware devices of that computing system, or a combination of these. These applications can be updated (e.g., periodically) via a direct internet upgrade patching mechanism or through an applications store (e.g., Apple iTunes and App store, Google Play store, and Windows Phone App store).

The system can run in platform-independent, non-native applications. For example, client can access the system through a web application from one or more servers using a network connection with the server or servers and load the web application in a web browser. For example, a web application can be downloaded from an application server over the Internet by a web browser. Non-native applications can also be obtained from other sources, such as a disk.

For the sake of clarity, the processes and methods herein have been illustrated with a specific flow, but it should be understood that other sequences may be possible and that some may be performed in parallel, without departing from the spirit of the invention. Additionally, steps may be subdivided or combined. As disclosed herein, software written in accordance with the present invention may be stored in some form of computer-readable medium, such as memory or CD-ROM, or transmitted over a network, and executed by a processor. More than one computer may be used, such as by using multiple computers in a parallel or load-sharing arrangement or distributing tasks across multiple computers such that, as a whole, they perform the functions of the components identified herein; i.e. they take the place of a single computer. Various functions described above may be performed by a single process or groups of processes, on a single computer or distributed over several computers. Processes may invoke other processes to handle certain tasks. A single storage device may be used, or several may be used to take the place of a single storage device.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

All references cited herein are intended to be incorporated by reference. While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A computer-implemented method of automatically assigning proxy nodes to proxy servers in a backup system running a data backup and restore program, comprising:
    defining, for each proxy server, available proxy nodes that may be shared with other proxy servers, and tightly coupled proxy nodes that are permanently assigned to a respective proxy server and removable only by manual command by a user;
    allocating, in a proxy component executed in a server computer of the backup system, the available proxy nodes to a common proxy node pool, the proxy nodes performing parallel backup functions of the backup and restore program and offloaded by the server computer, wherein each proxy node of the proxy nodes retrieves, during the backup, virtual machine (VM) data from a source data store and transfers it to destination storage media, and writes, during the restore, the VM data from the destination storage media back to the source data store by providing an optimal route for the VM data;
    defining rules for assignment of the proxy nodes to the proxy servers; receiving backup sessions from the proxy servers;
    assigning, by the proxy component, proxy nodes from the proxy node pool to the proxy servers in accordance with at least one of an order of received backup sessions and the defined rules;
    returning assigned proxy nodes back to the common proxy node pool upon completion of respective backup sessions to optimize use of resources of the backup system by improving efficiency of the data backup and restore program; and
    wherein the backup system comprises a plurality of hypervisors managing the proxy nodes, and wherein the available proxy nodes are allocated among the plurality of hypervisors.

2. The method of claim 1 wherein the rules comprise at least one of: a maximum number of received backup session and a priority of proxy servers relative to one another with respect to priority of respective backup sessions.

3. The method of claim 2 wherein each proxy server has at least one internal proxy node to perform a backup session for the proxy server.

4. The method of claim 3 further comprising defining a rule that binds at least one or more additional proxy nodes from the pool to the proxy server to ensure servicing of requested sessions for the proxy server.

5. The method of claim 1 wherein each proxy server issues a respective plurality of requested backup sessions.

6. The method of claim 5 wherein the assigning step is performed by a dynamic and automated process upon a request by the each proxy server for a requested backup session.

7. The method of claim 1 further comprising defining a policy for the assigning step, wherein the policy comprises a group of clients for the backup sessions and a backup operation to be performed by each backup session.

8. The method of claim 7 wherein the clients comprise virtual machine nodes in a large-scale backup network controlled by a hypervisor process.

9. The method of claim 7 wherein the backup operation comprises at least one of: data backup, data clone, data recovery, and data restore from one or more clients in the group.

10. A system for automatically assigning proxy nodes to proxy servers in a backup system running a data backup and restore program, comprising:
    a process defining, for each proxy server, available proxy nodes that may be shared with other proxy servers, and tightly coupled proxy nodes that are permanently assigned to a respective proxy server and removable only by manual command by a user;
    a first hardware processing component of a server computer of the backup system, allocating the proxy nodes to a common proxy node pool and defining rules for assignment of the proxy nodes to the proxy servers, the proxy nodes performing parallel backup functions of the backup and restore program and offloaded by the server computer, wherein each proxy node of the proxy nodes retrieves, during the backup, virtual may (VM) data from a source data store and transfers it to destination storage media, and writes, during the restore, the VM data from the destination storage media back to the source data store by providing an optimal route for the VM data;
    an interface receiving backup sessions from the proxy servers;
    an automated processing component assigning proxy nodes from the proxy node pool to the proxy servers in accordance with at least one of an order of received backup sessions and the defined rules, and returning assigned proxy nodes back to the common proxy node pool upon completion of respective backup sessions to optimize use of resources of the backup system by improving efficiency of the data backup and restore program; and
    wherein the backup system comprises a plurality of hypervisors managing the proxy nodes, and wherein the available proxy nodes are allocated among the plurality of hypervisors.

11. The system of claim 10 wherein the rules comprise at least one of: a maximum number of received backup session and a priority of proxy servers relative to one another with respect to priority of respective backup sessions.

12. The system of claim 11 wherein each proxy server has at least one internal proxy node to perform a backup session for the proxy server.

13. The system of claim 12 wherein the rules further bind at least one or more additional proxy nodes from the pool to the proxy server to ensure servicing of requested sessions for the proxy server.

14. The system of claim 10 wherein each proxy server issues a respective plurality of requested backup sessions, and wherein the assigning step is performed by a dynamic and automated process upon a request by the each proxy server for a requested backup session.

15. The system of claim 10 further comprising a second hardware processing component defining a policy for the assigning step, wherein the policy comprises a group of clients for the backup sessions and a backup operation to be performed by each backup session.

16. The system of claim 15 wherein the clients comprise virtual machine nodes in a large-scale backup network controlled by a hypervisor process.

17. The system of claim 16 wherein the backup operation comprises at least one of: data backup, data clone, data recovery, and data restore from one or more clients in the group.

18. A computer program product, comprising a non-transitory computer-readable medium having a computer-readable program code embodied therein, the computer-readable program code adapted to be executed by one or more processors to implement a method of automatically assigning proxy nodes to proxy servers in a backup system running a data backup and restore program, by:

defining, for each proxy server, available proxy nodes that may be shared with other proxy servers, and tightly coupled proxy nodes that are permanently assigned to a respective proxy server and removable only by manual command by a user;

allocating, in a proxy component executed in a server computer of the backup system, the available proxy nodes to a common proxy node pool, the proxy nodes performing parallel backup functions of the backup and restore program and offloaded by the server computer, wherein each proxy node of the proxy nodes retrieves, during the backup, virtual machine (VM) data from a source data store and transfers it to destination storage media, and writes, during the restore, the VM data from the destination storage media back to the source data store by providing an optimal route for the VM data;

defining rules for assignment of the proxy nodes to the proxy servers; receiving backup sessions from the proxy servers;

assigning, by the proxy component, proxy nodes from the proxy node pool to the proxy servers in accordance with at least one of an order of received backup sessions and the defined rules;

returning assigned proxy nodes back to the common proxy node pool upon completion of respective backup sessions to optimize use of resources of the backup system by improving efficiency of the data backup and restore program; and wherein the backup system comprises a plurality of hypervisors managing the proxy nodes, and wherein the available proxy nodes are allocated among the plurality of hypervisors.

\* \* \* \* \*